(12) United States Patent
Guen

(10) Patent No.: US 9,608,257 B2
(45) Date of Patent: Mar. 28, 2017

(54) RECHARGEABLE BATTERY HAVING UPPER COVER

(71) Applicant: SAMSUNG SDI CO., LTD., Yongin-si, Gyeonggi-do (KR)

(72) Inventor: Min-Hyung Guen, Yongin-si (KR)

(73) Assignee: Samsung SDI Co., Ltd., Yongin-Si, Gyeonggi-do (KR)

( * ) Notice: Subject to any disclaimer, the term of this patent is extended or adjusted under 35 U.S.C. 154(b) by 6 days.

(21) Appl. No.: 14/847,338

(22) Filed: Sep. 8, 2015

(65) Prior Publication Data

US 2016/0260960 A1 Sep. 8, 2016

(30) Foreign Application Priority Data

Mar. 3, 2015 (KR) ........................ 10-2015-0030015

(51) Int. Cl.
*H01M 2/34* (2006.01)
*H01M 2/04* (2006.01)

(52) U.S. Cl.
CPC ........... *H01M 2/345* (2013.01); *H01M 2/043* (2013.01); *H01M 2200/20* (2013.01); *H01M 2220/20* (2013.01)

(58) Field of Classification Search
CPC combination set(s) only.
See application file for complete search history.

(56) References Cited

U.S. PATENT DOCUMENTS

| | | | | |
|---|---|---|---|---|
| 2011/0052949 A1* | 3/2011 | Byun | ..................... | H01M 2/043 429/61 |
| 2011/0177387 A1* | 7/2011 | Byun | ...................... | H01M 2/04 429/178 |
| 2011/0183193 A1* | 7/2011 | Byun | .................. | H01M 2/0426 429/178 |
| 2011/0183198 A1* | 7/2011 | Byun | .................. | H01M 2/0456 429/185 |
| 2011/0244281 A1* | 10/2011 | Byun | ...................... | H01M 2/22 429/62 |
| 2011/0300419 A1* | 12/2011 | Byun | ...................... | H01M 2/22 429/61 |
| 2012/0070705 A1 | 3/2012 | Kim | | |

(Continued)

FOREIGN PATENT DOCUMENTS

KR  10-2009-0124110 A  12/2009
KR  10-2012-0029979 A   3/2012

*Primary Examiner* — Kaity Handal
(74) *Attorney, Agent, or Firm* — Lee & Morse, P.C.

(57) ABSTRACT

A rechargeable battery including an electrode assembly including a first electrode and a second electrode, a case that receives the electrode assembly therein, a first terminal electrically connected to the first electrode, a second terminal electrically connected to the second electrode, a cap plate coupled with an opening of the case and electrically connected to the first electrode, the cap plate including a short circuit hole, a short circuit member located in the short circuit hole, the short circuit member being deformable to electrically connect the cap plate to the second terminal, and an upper cover that covers the short circuit hole. The second terminal includes a positioning groove into which a lateral end of the upper cover is insertable, the upper cover being slidably installed with respect to the second terminal.

12 Claims, 7 Drawing Sheets

(56) References Cited

U.S. PATENT DOCUMENTS

| | | | |
|---|---|---|---|
| 2012/0156531 A1* | 6/2012 | Guen | H01M 2/0426 429/53 |
| 2012/0177978 A1* | 7/2012 | Kim | H01M 2/30 429/159 |
| 2012/0251874 A1* | 10/2012 | Guen | H01M 2/0217 429/179 |
| 2012/0263976 A1* | 10/2012 | Byun | H01M 2/266 429/7 |
| 2012/0315515 A1* | 12/2012 | Guen | H01M 2/0473 429/56 |
| 2012/0315516 A1* | 12/2012 | Kim | H01M 10/0525 429/61 |
| 2013/0095364 A1* | 4/2013 | Yong | H01M 2/02 429/120 |
| 2013/0196179 A1* | 8/2013 | Han | H01M 2/04 429/7 |
| 2014/0139185 A1* | 5/2014 | Han | H02J 7/0029 320/118 |
| 2014/0199562 A1* | 7/2014 | Kim | H01M 2/06 429/7 |
| 2014/0234669 A1* | 8/2014 | Byun | H01M 2/0217 429/7 |
| 2014/0234673 A1* | 8/2014 | Byun | H01M 2/348 429/61 |
| 2014/0255740 A1* | 9/2014 | Han | H01M 2/02 429/94 |
| 2014/0315056 A1* | 10/2014 | Guen | H01M 2/345 429/61 |
| 2015/0037628 A1* | 2/2015 | Guen | H01M 2/04 429/61 |
| 2015/0079429 A1* | 3/2015 | Han | H01M 2/345 429/61 |
| 2015/0111069 A1* | 4/2015 | Han | H01M 2/1252 429/7 |
| 2015/0118528 A1* | 4/2015 | Byun | H01M 2/043 429/61 |
| 2015/0255777 A1* | 9/2015 | Guen | H01M 2/04 429/53 |
| 2015/0263329 A1* | 9/2015 | Guen | H01M 2/345 429/53 |
| 2015/0263330 A1* | 9/2015 | Seo | H01M 2/345 429/7 |
| 2015/0280203 A1* | 10/2015 | Guen | H01M 2/345 429/61 |
| 2015/0280204 A1* | 10/2015 | Byun | H01M 2/348 429/61 |
| 2015/0287977 A1* | 10/2015 | Lee | H01M 2/345 429/89 |
| 2015/0295222 A1* | 10/2015 | Kwak | H01M 2/0473 429/61 |
| 2016/0043378 A1* | 2/2016 | Guen | H01M 2/34 429/179 |
| 2016/0043379 A1* | 2/2016 | Byun | H01M 2/345 429/61 |
| 2016/0043381 A1* | 2/2016 | Byun | H01M 2/348 429/61 |
| 2016/0126534 A1* | 5/2016 | Lee | H01M 2/348 429/61 |
| 2016/0141564 A1* | 5/2016 | Han | H01M 2/024 429/94 |
| 2016/0260954 A1* | 9/2016 | Kim | H01M 2/04 |
| 2016/0260956 A1* | 9/2016 | Jang | H01M 2/34 |
| 2016/0260959 A1* | 9/2016 | Guen | H01M 2/345 |

* cited by examiner

RECHARGEABLE BATTERY HAVING UPPER COVER

CROSS-REFERENCE TO RELATED APPLICATION

Korean Patent Application No. 10-2015-0030015, filed on Mar. 3, 2015, in the Korean Intellectual Property Office, and entitled: "Rechargeable Battery Having Upper Cover," is incorporated by reference herein in its entirety.

BACKGROUND

1. Field

Embodiments relate to a rechargeable battery.

2. Description of the Related Art

Unlike a primary battery that is incapable of being recharged, a rechargeable battery can be repeatedly charged and discharged. A low capacity rechargeable battery may be used in a small portable electronic device such as a mobile phone, a laptop computer, and a camcorder, and a large capacity portable battery may be used as a power supply for operating a motor or as a large capacity storage device of a hybrid vehicle or the like.

In recent years, a high power rechargeable battery using a non-aqueous electrolyte having high energy density has been developed. The high power rechargeable battery is configured as a large capacity battery module by connecting a plurality of rechargeable batteries to each other in series to be used to drive a motor of a device requiring a large amount of power, for example, an electric vehicle.

One large capacity rechargeable battery includes a plurality of individual rechargeable batteries that are connected to each other in series. The individual rechargeable battery may have a cylindrical or square shape.

SUMMARY

Embodiments are directed to a rechargeable battery including an electrode assembly including a first electrode and a second electrode, a case that receives the electrode assembly therein, a first terminal electrically connected to the first electrode, a second terminal electrically connected to the second electrode, a cap plate coupled with an opening of the case and electrically connected to the first electrode, the cap plate including a short circuit hole, a short circuit member located in the short circuit hole, the short circuit member being deformable to electrically connect the cap plate to the second terminal, and an upper cover that covers the short circuit hole. The second terminal includes a positioning groove into which a lateral end of the upper cover is insertable, the upper cover being slidably installed with respect to the second terminal.

The rechargeable battery may further include an upper insulator member located under the upper cover and the second terminal.

The upper insulator member may include a bottom that contacts the cap plate and a sidewall that protrudes from a lateral end of the bottom. The upper cover may be press-fitted in the upper insulator member.

The upper cover may include an upper plate and a lateral plate that protrudes toward the cap plate from a lateral end of the upper plate, the lateral plate being inserted in the upper insulator member.

The upper plate may include a guide protrusion that protrudes to an outer side of the upper cover. The sidewall of the upper insulator member may include a guide groove in which the guide protrusion is inserted.

The guide groove may be longer than the guide protrusion in a sliding movement direction of the upper cover.

The upper cover may be located at an inner side of the sidewall of the upper insulator member. The upper cover may include a blocking wall that protrudes toward the cap plate.

The blocking wall may include a transverse section having a ring shape.

The rechargeable battery may further include a short circuit plate under the second terminal, the short circuit plate including a connection hole located at an upper portion of the short circuit member.

The short circuit plate may further include an exhaust groove under the blocking wall of the upper cover.

The exhaust groove may be connected to the connection hole.

At least one of the sidewalls of the upper insulator member may include a gap spaced apart from the short circuit plate and communicating with the exhaust groove.

The blocking wall may contact a top surface of the short circuit plate.

The exhaust groove may be selectively connected to external air according to a sliding position of the upper cover.

The short circuit plate may include a short circuit protrusion that surrounds the connection hole.

The short circuit member may include an edge part and a curved part, the curved part being convexly curved in a downward direction from the edge part.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
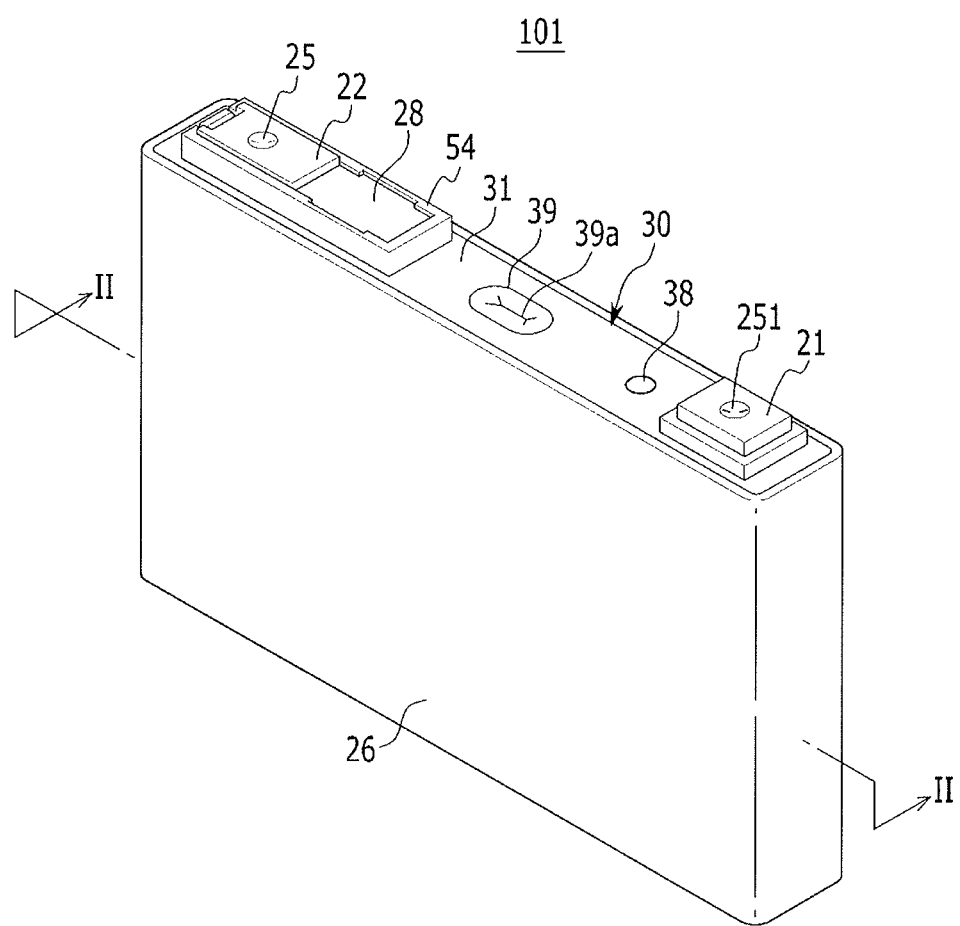
FIG. 1 illustrates a perspective view depicting a rechargeable battery according to an exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when an element is referred to as being "on," "under," or "between" another element, it can be directly on, under, or between the other element, or intervening elements may also be present. Like reference numerals refer to like elements throughout.

Figure 2:
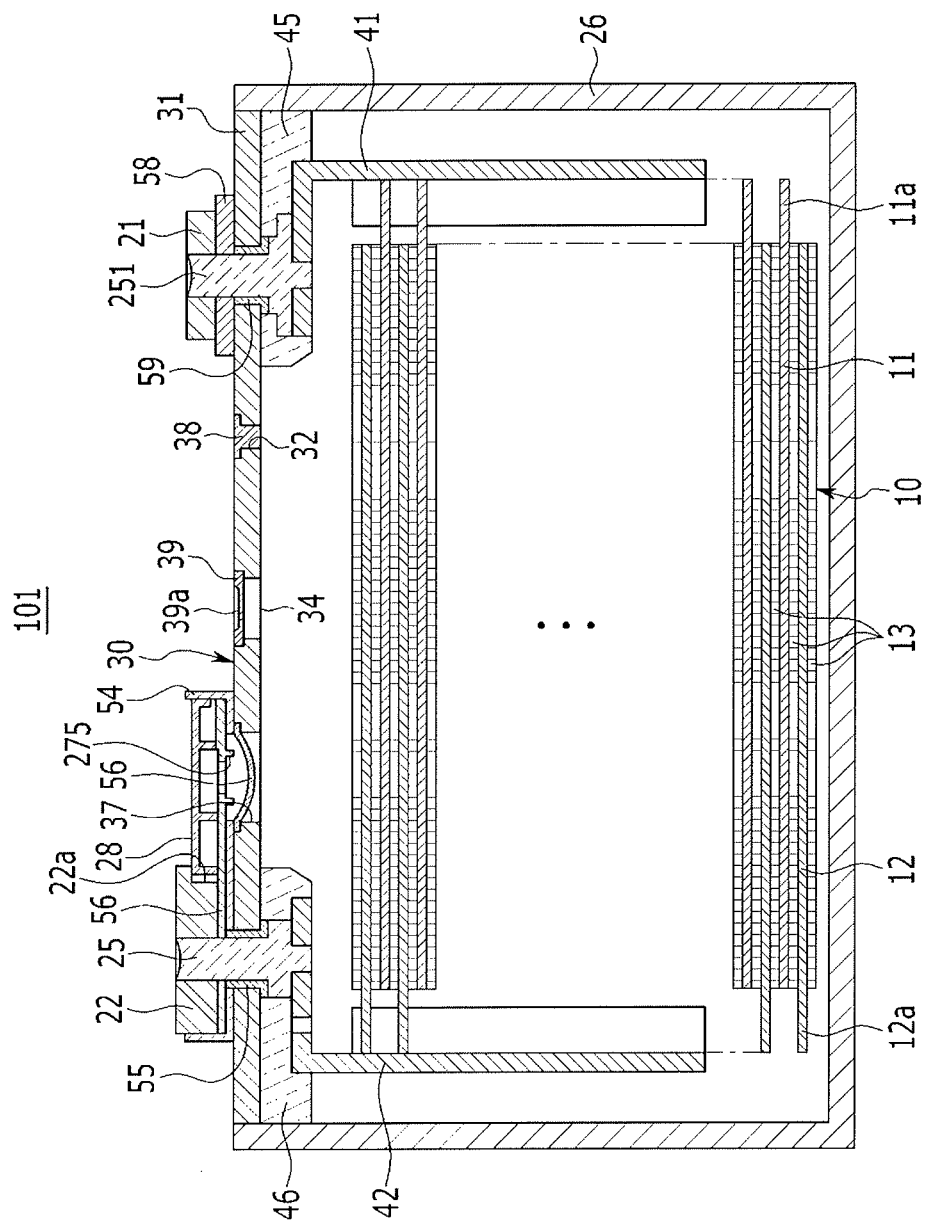
FIG. 2 illustrates a cross-sectional view taken along line II-II of FIG. 1.

FIG. 1 illustrates a perspective view depicting a rechargeable battery according to an exemplary embodiment, and FIG. 2 is a cross-sectional view taken along line II-II of FIG. 1.

Referring to FIG. 1 and FIG. 2, the rechargeable battery 101 may include an electrode assembly 10 wound by interposing a separator 13 between a positive electrode (first electrode) 11 and a negative electrode (second electrode) 12, a case 26 to receive the electrode assembly 10 therein, and a cap assembly 30 coupled with an opening of the case 26.

The rechargeable battery 101 may be one of various types of batteries such as a lithium polymer battery or a cylindrical battery. For example, as described and illustrated herein, the rechargeable battery 101 may be a lithium ion secondary battery having a square shape.

The positive electrode 11 and the negative electrode 12 may each include a current collector formed of a metal foil in a form of a thin plate and including a coating region that is coated with an active material, and respective uncoated regions 11a and 12a that are not coated with the active material. The positive electrode uncoated region 11a may be formed at one end of the positive electrode 11 in a longitudinal direction of the positive electrode 11, and the negative uncoated region 12a may be formed at an opposite end of the negative electrode 12 in a longitudinal direction of the negative electrode 12. The positive electrode 11 and the negative electrode 12 may be spirally wound while interposing the separator 13, as an insulator, therebetween.

In some implementations, electrode assembly 10 may have a laminated structure where the positive electrode and the negative electrode are made of a plurality of sheets, with the separator interposed between.

The case 26 may have a substantially cuboid shape. An opening may be formed at one surface of the case. The case 26 may be made of a metal such as aluminum and stainless steel.

The cap assembly 30 may include a cap plate 31 that covers the opening of the case 26 and a first terminal and a second terminal 22 that protrude to an outer side of the cap plate 31. The first terminal 21 may be electrically connected to the positive electrode 11 and an outer side of the cap plate 31.

The cap plate 31 may have a plate shape which is formed long in one direction. The cap plate 31 may be coupled with the opening of the case 26. The cap plate 31 may include an electrolyte injection opening 32, and a sealing stopper 38 may be formed in the electrolyte injection opening 32. A vent hole 34 may be formed in the cap plate 31, and a vent plate 39 with a notch 39a formed therein may be formed in the vent hole 34 to be openable at a preset pressure.

The first terminal 21 and the second terminal 22 may protrude to an upper portion of the cap plate 31. The first terminal 21 may be electrically connected to the positive electrode 11 through a first current collecting tab 41, and the second terminal 22 is electrically connected to the negative electrode 12 through a second current collecting tab 42. In other implementations, the first terminal 21 may be electrically connected to the negative electrode 12, and the second terminal 22 may be electrically connected to the positive electrode 11.

The first terminal 21 may have a rectangular plate shape. The first terminal 21 is electrically connected to the positive electrode 11 through a first rivet terminal 251 bonded to the first current collecting tab 41. The second terminal 22 may be electrically connected to the negative electrode 12 through a second rivet terminal 25 bonded to the second current collecting tab 42. The second rivet terminal 25 may include a pillar portion 25a extending through the cap plate 31, a flange portion 25b below the cap plate 31, and a connecting portion 25c that connects the second rivet terminal 25 with the second current collecting tab 42. The first rivet terminal 251 coupled with the first terminal 21 may have a similar structure as the second rivet terminal 25 coupled with the second terminal 22.

A sealing gasket 59 may be inserted and installed in a hole formed through a terminal between the first terminal 21 and the cap plate 31. A lower insulator member 45 that insulates the first terminal 21 and the first current collecting tab 41 from the cap plate 31 may be installed under the cap plate 31.

A connecting plate 58 that electrically connects the first terminal 21 to the cap plate 31 may be installed under the first terminal 21. The connecting plate 58 may be disposed between the cap plate 31 and the first terminal 21, and the first rivet terminal 251 may be installed through the connecting plate 58. The cap plate 31 may be electrically connected to the first terminal 21 by the above structure.

Figure 5:
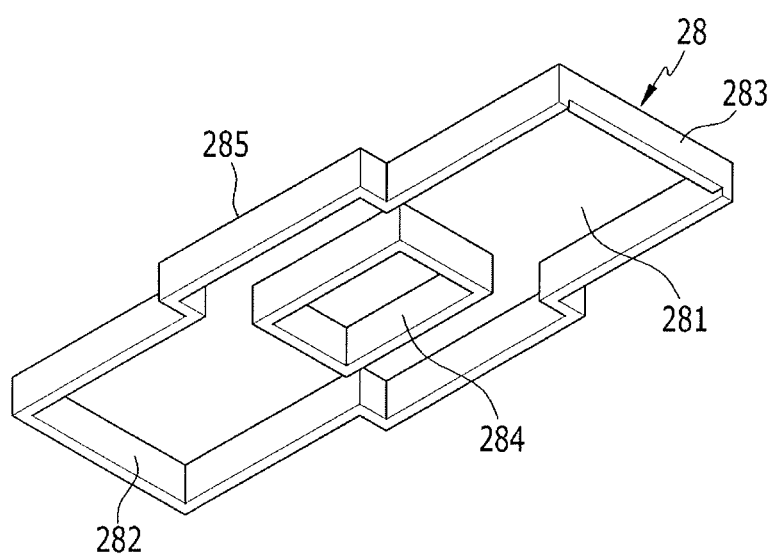
FIG. 5 illustrates a perspective view depicting an upper cover according to an exemplary embodiment viewed from the bottom.
Figure 6:
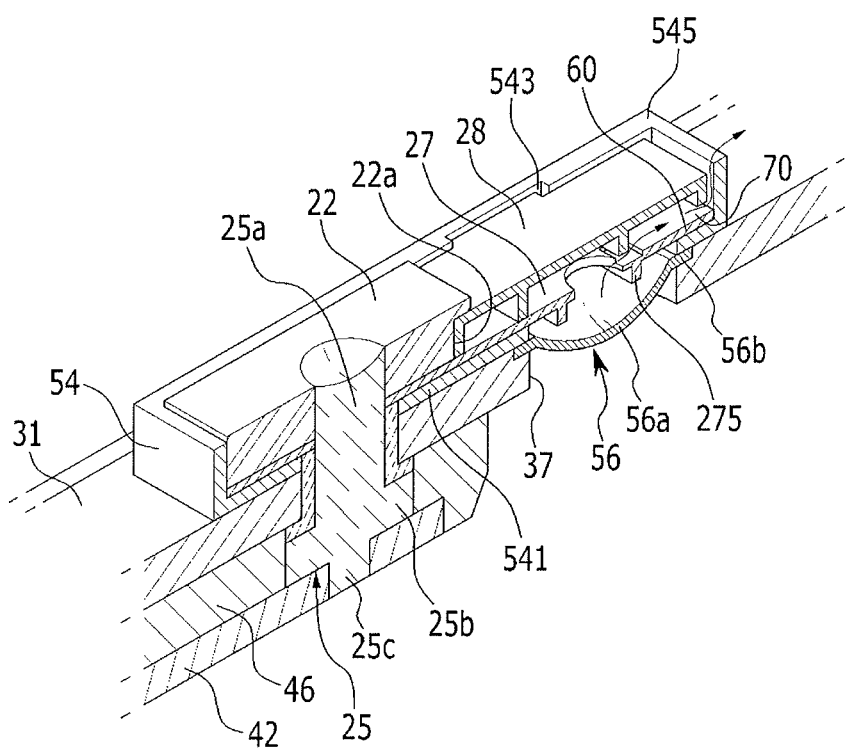
FIG. 6 illustrates a cut-away perspective view depicting a state that an upper space of the short circuit member is open.

Referring to FIGS. 2, 5, and 6, the second terminal 22 may have a rectangular plate shape. The second terminal 22 may be electrically connected to the negative electrode 12 through the second rivet terminal 25 bonded to the second current collecting tab 42. A top end of the second rivet terminal 25 may be fixed to the second terminal 22 through the cap plate 31 and the second terminal 22.

A sealing gasket 55 may be inserted and installed in a hole through which the terminal is formed between the second terminal 22 and the cap plate 31. A lower insulator member 46 that insulates the second terminal 22 and the current collecting tab 42 from the cap plate 31 may be installed under the cap plate 31.

The cap assembly 30 may include a short circuit member 56 to short-circuit the positive electrode 11 with the negative electrode 12. The short circuit member 56 may be electrically connected to the cap plate 31. When the internal pressure of the rechargeable battery 101 increases to an undesirable extent, the short circuit member 56 may be deformed to be connected to the second terminal 22.

When the internal pressure increases to the undesirable extent, the short circuit member 56 may be deformed. A charged current may be discharged by electrically connecting the cap plate 31 charged by positive electrode to the short circuit plate 27 charged by the negative electrode.

The cap plate 31 may be formed therein with a short circuit hole 37. The short circuit hole 37 may be formed therein with the short circuit member 56, which is deformable to be connectable to the second terminal 22 when internal pressure of the rechargeable battery 101 is increases. The short circuit 56 includes a curved part 56a that is convexly curved downward and an edge part 56b that is continuously formed along a circumference of the curved part 56a and has a plane shape.

A short circuit plate 27 may be installed under the second terminal 22. The short circuit plate 27 may be disposed between the second terminal 22 and the cap plate 31. An upper insulator member 54 may be installed between the short circuit plate 27 and the cap plate 31. The upper insulator member 54 includes a bottom 541 having a rectangular plate shape and a sidewall 545 protruding from the bottom 541.

Figure 3:
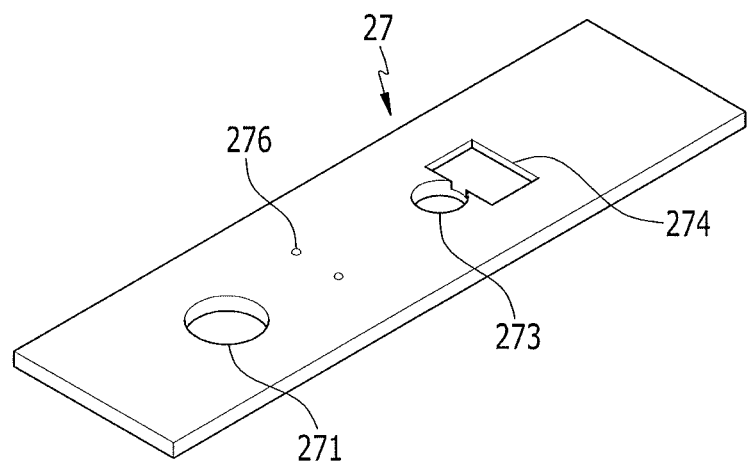
FIG. 3 illustrates a perspective view depicting a short circuit plate according to an exemplary embodiment.

FIG. 3 illustrates a perspective view depicting a short circuit plate according to an exemplary embodiment.

Referring to FIG. 3, the short circuit plate 27 may have a square plate shape extending to the short circuit hole 37 from a lower portion of the second terminal 22. The short circuit plate 27 may include a connection hole 273 formed to be located above an upper portion of the short circuit member 56 and a terminal hole 271 in which the second rivet terminal 25 connected to the second terminal 22 is inserted.

The short circuit plate 27 may be formed therein with a short circuit protrusion 275 that protrudes toward the short circuit member 56. The short circuit protrusion 275 may surround a bottom end of the connection hole 273. An exhaust groove 274 may be formed in the short circuit plate 27, and the exhaust groove 274 is disposed under a blocking wall 284. The exhaust groove 274 may be connected to the connection hole 273 and may be selectively connected to external air according to sliding of the upper cover 28.

Figure 4:
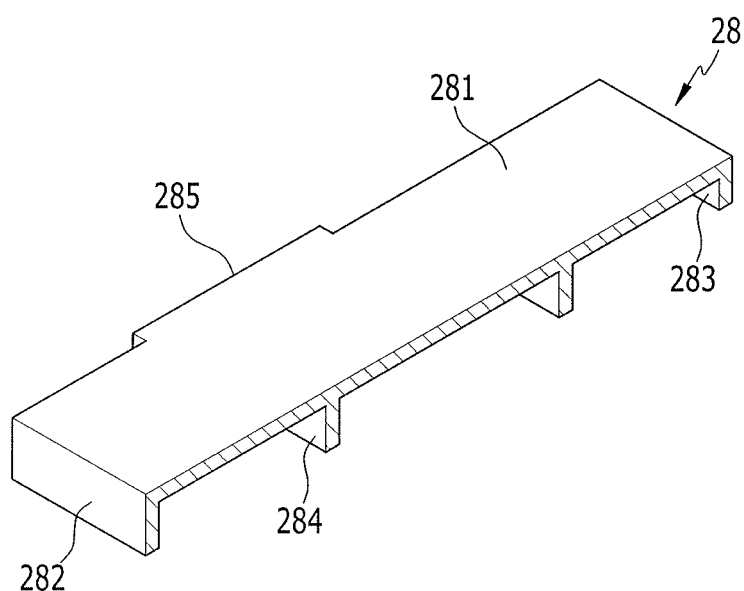
FIG. 4 illustrates a perspective view depicting an upper cover according to an exemplary embodiment.
Figure 7:
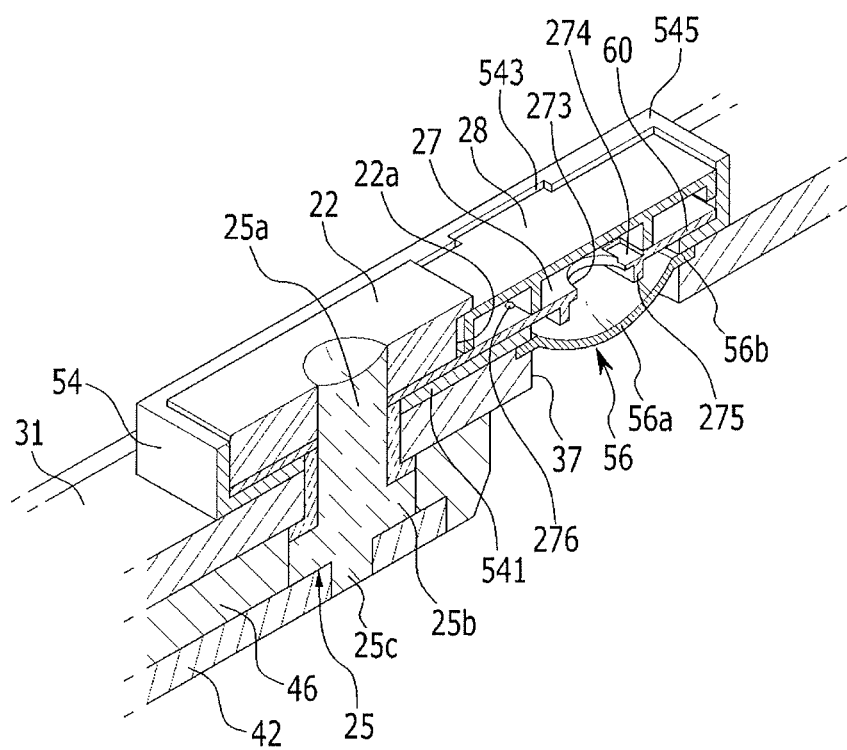
FIG. 7 illustrates a cut-away, perspective view depicting a state that an upper space of the short circuit member is closed.

FIG. 4 illustrates a perspective view of an upper cover according to an exemplary embodiment. FIG. 5 illustrates a perspective view depicting an upper cover according to an exemplary embodiment viewed from the bottom. FIG. 6 illustrates a cut-away perspective view depicting a state that an upper space between the short circuit member and the upper insulator member 54 is open. FIG. 7 illustrates a cut-away, perspective view depicting a state that an upper space between the short circuit member and the upper insulator member is closed.

Referring to FIGS. 4, 5, 6, and 7, an upper cover 28 that covers the short circuit hole 37 may be installed at an upper portion of the short circuit plate 27. The second terminal 22 may be formed with a horizontally open positioning groove 22a therein, and the upper cover 28 may be slidably installed with respect to the second terminal 22. The positioning groove 22a may be formed at a lateral bottom end of the second terminal 22 facing toward the upper cover 28. The upper cover 28 may be inserted into or separated from the positioning groove 22a according to a sliding movement.

The upper cover 28 may be disposed close to the second terminal 22. The upper cover 28 may be made of a polymer having an insulating property. The upper cover 28 may be press-fitted into the upper insulator member 54, and may prevent a material, such as an external material, from making contact with the short circuit member 56.

The upper cover 28 may include an upper plate 281 in a form of a rectangular plate, and first and second lateral plates 282 and 283 protruding toward the cap plate 31 from first and second lateral ends of the upper plate 281. The first and second lateral plates 282 and 283 may be inserted into the upper insulator member 54.

The upper plate 281 may include a guide protrusion 285 that protrudes to an outer side. The sidewall 545 of the upper insulator member 54 may include a guide groove 543 formed therein, into which the guide protrusion 285 is inserted. The guide protrusion 285 and the guide groove 543 may be continuously formed in a sliding direction of the upper cover 28. The guide groove 543 may be longer than the guide protrusion 285 in a sliding movement direction of the upper cover 28. Accordingly, the guide groove 543 may guide the guide protrusion 285 such that the upper cover 28 may be slid.

A bottom of the guide groove 543 may be gradually inclined upwardly in the direction of the second terminal 22. A bottom surface of the guide protrusion 285 may also be gradually inclined upwardly in the direction of the second terminal. Accordingly, if the short circuit member becomes inverted such that pressure under the upper cover 28 is increased, the upper cover 28 may be pushed upward to be slid in the direction of the second terminal.

The upper cover 28 may include a blocking wall 284 located inwardly from the first and second lateral plates 282 and 283. The blocking wall 284 may include a transverse surface having a ring shape that protrudes toward the cap plate 31. The blocking wall 284 may have a square ring shape or a circular ring shape.

The blocking wall 284 may contact a top surface 60 of the short circuit plate 27. The blocking wall may be plural in number, and one of the blocking walls 284 may be located at an upper portion of the exhaust groove 274 of the short circuit plate 27. The exhaust groove 274 and the one blocking wall 284 may be located with respect to each other such that, depending on the positioning of the upper cover 28, the exhaust groove 274 may be positioned under an inner space in which the blocking wall 284 is formed so as to be blocked from external air or exhaust groove 274 may be located at an outer side of the blocking wall 284 to be connected to external air. The short circuit plate 27 may include a stopper 276 that protrudes to contact a bottom end of the blocking wall 284. The stopper 276 may support the upper cover 28 to help prevent shaking. When the upper cover 28 is pressurized, the blocking wall 284 may slide through the stopper 276.

A bottom end of the first lateral plate 282 and bottom ends of the blocking walls 284 may contact a top end of the short circuit plate 27. A bottom end of the second lateral plate 283 may be spaced apart from a top end of the short circuit plate 27. When the upper cover 28 is moved in a direction towards the second electrode terminal 22, the second lateral plate 283 may be separated from the sidewall 545. A gap 70 may be formed between the second lateral plate 283 and the top surface 60 of the short circuit plate 27. The gap 70 may communicate with the exhaust groove 274.

As shown in FIG. 6, if the upper cover 28 is slid and is inserted into the positioning groove 22a, the connection hole 273 may be connected to external air through the exhaust groove 274 such that gas present at an upper portion of the short circuit member 56 may be exhausted to the outside. As shown in FIG. 7, if the upper cover 28 is slid such that the second lateral plate 283 makes contact with the sidewall 545, the exhaust groove 274 may be blocked by the blocking wall 284 and introduction of foreign materials may be blocked.

If internal pressure of the rechargeable battery 101 is increased, the short circuit member 56 may be convexly deformed in an upward direction. When the short circuit member 56 is deformed upwardly, an upper space of the short circuit member 56 may be reduced. Upper pressure on the short circuit member 56 may be increased and the short circuit member 56 may be prevented from deforming further in the upward direction. However, according to the present exemplary embodiment, the upper pressure on the short circuit member 56 may be reduced by sliding the upper cover 28. Accordingly, the short circuit member 56 may be stably operated at a preset pressure.

By way of summation and review, it is desirable for a rechargeable battery to include a safety apparatus capable of preventing excessive heat during overcharge and to ensure safety. Further, when internal short-circuiting or external short-circuiting is generated, it is desirable for the rechargeable battery to have a safety apparatus capable of reducing pressure inside the rechargeable battery Embodiments provide a rechargeable battery having an upper cover that improves safety. According to embodiments, gas above a short circuit member may be exhausted according to sliding of the upper cover. Accordingly, when internal pressure of the rechargeable battery is increased, the short circuit member may be easily inverted.

Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope thereof as set forth in the following claims.

What is claimed is:

1. A rechargeable battery, comprising:
    an electrode assembly including a first electrode and a second electrode;
    a case that receives the electrode assembly therein;
    a first terminal electrically connected to the first electrode;
    a second terminal electrically connected to the second electrode;
    a cap plate coupled with an opening of the case and electrically connected to the first electrode, the cap plate including a short circuit hole;
    a short circuit member located in the short circuit hole, the short circuit member being deformable to electrically connect the cap plate to the second terminal; and
    an upper cover that covers the short circuit hole, the upper cover including an upper plate and a lateral plate that protrudes toward the cap plate from a lateral end of the upper plate, and the upper cover including a blocking wall that protrudes toward the cap plate;
    an upper insulator member located under the upper cover and the second terminal, the upper insulator member includes a bottom that contacts the cap plate and a sidewall that protrudes from a lateral end of the bottom, the lateral plate of the upper cover being inserted in the upper insulator member such that the upper cover is located at an inner side of the sidewall of the upper insulator member;
    a short circuit plate positioned under the second terminal and including an exhaust groove under the blocking wall of the upper cover;
    wherein the second terminal includes a positioning groove into which a lateral end of the upper cover is insertable, the upper cover being slidably installed with respect to the second terminal such that a gap is created between the sidewall of the upper insulator member and the second lateral plate of the upper cover.

2. The rechargeable battery as claimed in claim 1, wherein:
    the upper cover is press-fitted in the upper insulator member.

3. The rechargeable battery as claimed in claim 1, wherein:
    the upper plate includes a guide protrusion that protrudes to an outer side of the upper cover, and
    the sidewall of the upper insulator member includes a guide groove in which the guide protrusion is inserted.

4. The rechargeable battery as claimed in claim 3, wherein the guide groove is longer than the guide protrusion in a sliding movement direction of the upper cover.

5. The rechargeable battery as claimed in claim 1, wherein the blocking wall includes a transverse section having a ring shape.

6. The rechargeable battery as claimed in claim 1, wherein the short circuit plate includes a connection hole located at an upper portion of the short circuit member.

7. The rechargeable battery as claimed in claim 6, wherein the short circuit plate includes a short circuit protrusion that surrounds the connection hole.

8. The rechargeable battery as claimed in claim 1, wherein the exhaust groove is connected to the connection hole.

9. The rechargeable battery as claimed in claim 1, wherein sliding the upper cover further creates a gap between the sidewall of the upper insulator member and the short circuit plate;
    the gap communicating with the exhaust groove.

10. The rechargeable battery as claimed in claim 1, wherein the blocking wall contacts a top surface of the short circuit plate.

11. The rechargeable battery as claimed in claim 10, wherein the exhaust groove is selectively connected to external air according to a sliding position of the upper cover.

12. The rechargeable battery as claimed in claim 1, wherein the short circuit member includes an edge part and a curved part, the curved part being convexly curved in a downward direction from the edge part.

* * * * *